(12) United States Patent
Wu et al.

(10) Patent No.: US 7,139,097 B2
(45) Date of Patent: Nov. 21, 2006

(54) PAPERLESS PRINT

(75) Inventors: Vincent Wu, Irvine, CA (US); Cuong Tran, Orange, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1003 days.

(21) Appl. No.: 10/095,606

(22) Filed: Mar. 11, 2002

(65) Prior Publication Data

US 2003/0169466 A1    Sep. 11, 2003

(51) Int. Cl.
G06F 15/00 (2006.01)
G06F 17/30 (2006.01)
H04N 1/46 (2006.01)

(52) U.S. Cl. .................. 358/1.9; 358/504; 707/10; 707/200; 707/204

(58) Field of Classification Search ........... 358/1.15, 358/1.9, 1.1, 504, 3.23; 400/76; 707/10, 707/200, 204
See application file for complete search history.

(56) References Cited

U.S. PATENT DOCUMENTS

| | | |
|---|---|---|
| 5,369,742 A | 11/1994 | Kurosu et al. |
| 5,428,747 A | 6/1995 | Kitamoto |
| 5,617,115 A | 4/1997 | Itoh et al. |
| 5,619,649 A | 4/1997 | Kovnat et al. |
| 5,708,806 A | 1/1998 | DeRose et al. |
| 5,910,180 A | 6/1999 | Flory et al. |
| 5,940,584 A | 8/1999 | Zufle |
| 5,991,783 A | 11/1999 | Popa et al. |
| 5,995,986 A | 11/1999 | Ueda et al. |
| 6,012,071 A | 1/2000 | Krishna et al. |
| 6,061,698 A | 5/2000 | Chadha et al. |
| 6,067,554 A | 5/2000 | Hohensee et al. |
| 6,175,839 B1 | 1/2001 | Takao et al. |
| 6,198,542 B1 | 3/2001 | Tabata |
| 6,199,082 B1 | 3/2001 | Ferrel et al. |
| 6,219,818 B1 | 4/2001 | Freivald et al. |
| 6,641,312 B1 * | 11/2003 | Chang et al. .................. 400/76 |
| 6,930,790 B1 * | 8/2005 | Forthoffer .................. 358/1.15 |

* cited by examiner

*Primary Examiner*—Kimberly Williams
*Assistant Examiner*—Charlotte M. Baker
(74) *Attorney, Agent, or Firm*—Tucker Ellis & West LLP

(57) ABSTRACT

The present invention provides a method and system for testing the output of a digital imaging system. The method comprises the steps of sending a test job to a test digital imaging system and generating test information. The test information suitably comprises a plurality of computed values, each computed value corresponding to a portion of the test job. The test information is then compared with control information produced by sending the test job to a control digital imaging system. In addition, the invention provides a digital imaging device designed to accept test job and capable of generating the test information upon initiation of testing procedures.

22 Claims, 2 Drawing Sheets

PAPERLESS PRINT

BACKGROUND OF THE INVENTION

This invention pertains generally to digital imaging devices and the use of drivers, and more particularly to the use of a paperless command in testing driver functionality.

Digital imaging devices ("DID") are complex machines that require administration attention. DIDs suitably include devices such as printers, fax machines, scanners, copiers, multi-functional peripherals ("MFPs"), and other like peripheral devices. In addition, DIDs are often connected to a network. In order to manage most DIDs on a network, administrators make use of either a Common Information Model ("CIM") or a Simple Networking Management Protocol ("SNMP"). Both architectures provide an almost universal and platform independent mechanism to access and interface with digital imaging devices. For each DID, the Original Equipment Manufacturer ("OEM") creates a description of device management information relating to CIM and SNMP networks. Such management information generally includes textual binary descriptors that describe the nature of the device, the management capabilities of the device, the names of the objects native to the device, the types of actions the device can perform, etc. Value-added resellers ("VAR"), OEMs, or vendors then utilize the device management information to access and control the DIDs and to create software for managing the DIDs. In particular, device drivers are developed.

Device drivers are pieces of software that enable computers to communicate with peripheral devices. In doing so, they are responsible for accessing hardware registers of the device. Device drivers often form part of the lowest level of an operating system ("OS") kernel, with which they are linked when the kernel is built. OS also accept loadable device drivers that can be installed after the OS is running.

As OS and DID change, device drivers must often be changed to accommodate a change in technology. As new device drivers are created, designers must verify the quality of the drivers. In the past, this was accomplished by creating a test job having known results and sending it to a DID operating with the new driver. If the DID is a MFP, printer, fax machine or the like, the DID suitably outputs or prints the test job, and the printed output is then compared to a control printed test job. However, this process is extraordinarily time-consuming and difficult because adequately testing DID drivers often requires that the test jobs be thousands of pages. In addition, comparing two printed pages is a difficult task, as the pages may contain visually imperceptible differences.

SUMMARY OF THE INVENTION

It is therefore an object of the present invention to provide an improved method of testing the output of a digital imaging device. The present invention provides a method of testing the output of a digital imaging system. The method comprises the steps of sending a test job to a test digital imaging system and generating test information. The test information suitably comprises a plurality of computed values, each computed value corresponding to a portion of the test job. The test information is then compared with control information produced by sending the test job to a control digital imaging system.

The present invention also provides a digital imaging device adapted to receive a test job. The digital imaging device comprises a means for receiving a test job and a means for generating test information. The generated test information suitably comprises setting information for the digital imaging device at the time of generating test information, and a plurality of checksum values, each checksum value corresponding, to a face of the received test job. The digital imaging device also comprises a means for saving the generated test information in a computer readable format.

DETAILED DESCRIPTION OF THE INVENTION

Figure 1:
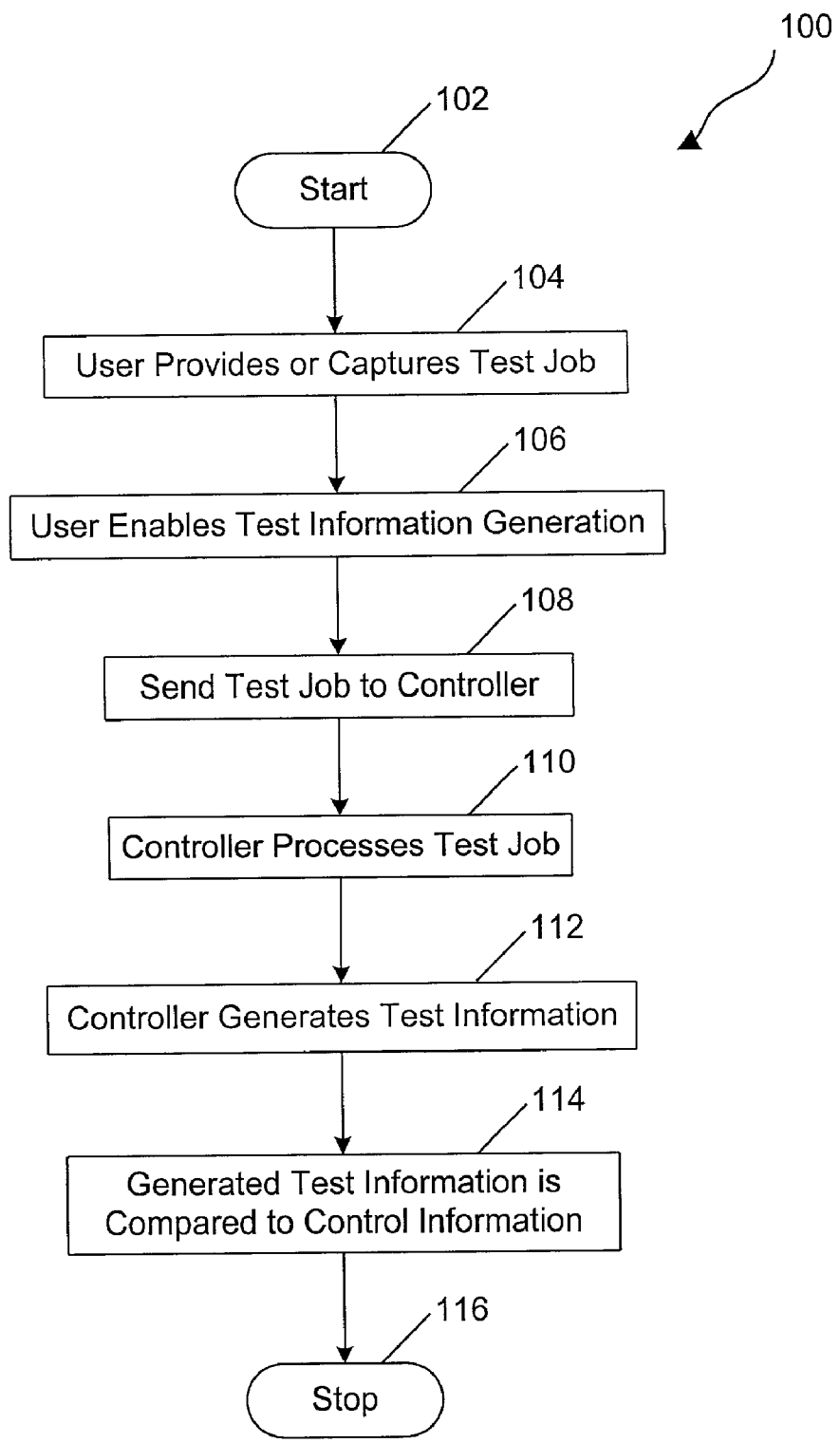
FIG. 1 is a flowchart generally depicting a method of testing the output of a digital imaging system in accordance with the present invention.

Turning now to FIG. 1, a flowchart generally depicting a method of testing the output of a digital imaging system in accordance with the present invention is provided. The general flow 100 commences at start block 102 and continues to process block 104. At process block 104, a user provides a test job for the digital imaging system to be tested. Progression then flows to process block 106 where the user enables test information generation. Flow continues to process block 108 where the test job is sent to a digital imaging system. Flow progresses to process block 110 where the digital imaging system processes the test job and then generates test information at process block 112. Progression then continues to process block 114 where the generated test information is compared to control information generated by sending the test job to a control digital imaging system, after which progression flows to termination block 116.

In the presently preferred embodiment of the invention, the DID is suitably any device which generates digital images. In addition, the digital imaging system suitably comprises a digital imaging device and a digital imaging device driver. Likewise, the control digital imaging system suitably comprises a digital imaging device and a digital imaging device driver. Furthermore, the test digital imaging device is suitably the same device as the control digital imagine device while the test digital imaging device driver is different than the control digital imaging device driver when testing a digital imaging device driver. The method of testing preferably involves user input. The user is suitably a client, network administrator, developer or any person with access to the digital imaging system. In addition, the test information generation is suitably enabled by an automated process or software program, such as maintenance or automation software.

The test job provided by the client or user is preferably prepared in advance so as to properly test the functionality of the DID. Ideally, the test job is prepared such that the digital imaging system will utilize all of its available functionality in preparing the test job output. As such, the test job is suitably a large job. The test job is suitably monochromatic, color, or a combination of monochromatic and color and preferably comprises both text and images. The output of the test job preferably comprises a plurality of pages, each page having two faces, a front and back.

Preferably, a user enables test job information generation by inserting PJL comments in a print data file. In the presently preferred embodiment, the DIDs are capable of accepting at least three PJL comments. A first comment preferably instructs the DID that test job information generation ("paperless printing") is enabled. An example of an enabling comment is:

@PJL COMMENT DSSC PRINT PAPERLESS=1 where "1" enables and "0" disables paperless printing. In addition, the DID is preferably configured such that its default is "0" where no PJL comment exists so that paperless printing is disabled unless specifically enabled.

The DID is also preferably configured to accept a second PJL comment, the filename comment, which preferably specifies the filename in which to store the paperless print output, or the test job information. The filename is suitably both a file name and a file location, and suitably includes drive and directory information. In the presently preferred embodiment, the file name is variable in length with a maximum length of 256 characters. An example of a filename comment is:

@PJL COMMENT DSSC PRINT PAPERLESSFILE=FILENAME.

In addition, the DID is preferably configured to accept a third PJL comment, the job name comment, which preferably specifies the name of the test job for future reference. In the presently preferred embodiment, the job name has a length of 16 characters. An example of a filename comment is:

@PJL COMMENT DSSC PRINT PAPERLESSNAME=ABCDABCDABCDABCD.

After receiving the test job with comments, the DID preferably generates test information based on the test job data file and comments. Preferably, the generated test information is saved in the file set forth in the filename comment. In the presently preferred embodiment, the generated test information is saved in a text file. It should be noted that the information is also suitably saved as records in a database, as a database file, or as any other format suitable for data retrieval as will be apparent to those skilled in the art.

In the presently preferred embodiment, the generated test information is saved in a text file. The text file preferably contains information comprising: job name, total number of faces, status, resolution, print mode, paper size, paper source, collating, duplexing, input bin, output bin, stapling, hole punching, organizational code, and checksum. In addition, the DID preferably generates line numbers for reference purposes. Preferably, the first line of the text file is of the format:

Line 1: <Job Name(16C)><Space(1C)><Total Faces(4C)><Space(1C)><Status(1C)>

The job name is preferably the 16 character job name as set forth in the job name PJL comment. In addition, the characters are preferably not limited except as required by the OS on which the DID resides.

When the DID generates test job information, it suitably generates for each portion of the test job, a file and corresponding computed value uniquely representing the generated file. As such, the DID suitably generates a total number of portions to which generated files and computed values correspond. In the presently preferred embodiment, the portion of the file is a face. When the DID receives the test job, it preferably calculates the total number of faces to be generated. A one character space preferably separates the job name from the total number of faces of the test job. Preferably, 4 characters are allotted for the number of total pages in the test job. As such, the test job preferably ranges from 1 side of one page, 1 face, to 9,999 faces. Generally, DIDs having more native functionality require larger test jobs.

In addition, upon receiving the test job, the DID suitably generates a status notification. A one character space preferably separates the total number of faces of the test job from the DID status. The status preferably describes whether the DID is capable of generating the test job output without error. An example of a presently preferred list of returns for the status byte is shown in Table 1.

TABLE 1

| Status Byte | |
| --- | --- |
| Status Byte | Status |
| 0 | OK |
| 1 | FAIL |

The second line of the text file in the presently preferred embodiment contains a PJL dump. Preferably, the second line of the text file is of the format:

Line 2: <PJL Dump (21C)>

The PJL Dump is preferably 21 characters and contains a variety of information relating to printer settings and modes at the time of generating the test job output. The first byte (Byte 1) of the 21 character PJL Dump preferably describes the resolution of the output of the DID. An example of a presently preferred list of returns for the resolution byte is shown in Table 2.

TABLE 2

| Resolution Byte | |
| --- | --- |
| Byte 1 | Representation |
| 6 | 600 dpi |
| 3 | 300 dpi |
| S | Fax Standard (200 × 100 dpi) |
| F | Fax Fine (200 × 200 dpi) |
| G | Fax Super Fine (400 × 200 dpi) |
| U | Fax Ultra Fine (400 × 400 dpi) |

Byte 2 of the 21 character PJL Dump preferably describes the output mode or print mode of the DID. An example of a presently preferred list of returns for the output mode byte is shown in Table 3.

TABLE 3

| Output Mode Byte | |
| --- | --- |
| Byte 2 | Representation |
| N | Normal |
| P | Private |
| R | Proof Print |
| B | Proof Buddy |
| F | Fax |
| S | Schedule Print |
| T | Schedule Fax |

Byte 3 of the 21 character PJL Dump preferably describes whether the paper size changes during the test job. An example of a presently preferred list of returns for the paper size change byte is shown in Table 4.

TABLE 4

Paper Size Change Byte

| Byte 3 | Representation |
| --- | --- |
| 0 | Off |
| 1 | On |

Byte 4 of the 21 character PJL Dump preferably describes whether the paper source changes during the test job. An example of a presently preferred list of returns for the paper source change byte is shown in Table 5.

TABLE 5

Paper Source Change Byte

| Byte 4 | Representation |
| --- | --- |
| 0 | Off |
| 1 | On |

Byte 5 of the 21 character PJL Dump preferably describes whether the collate function of the DID is active. An example of a presently preferred list of returns for the collate byte is shown in Table 6.

TABLE 6

Collate Byte

| Byte 5 | Representation |
| --- | --- |
| 0 | Off |
| 1 | On |

Byte 6 of the 21 character PJL Dump preferably describes whether the duplex function of the DID is active. An example of a presently preferred list of returns for the duplex byte is shown in Table 7.

TABLE 7

Duplex Byte

| Byte 6 | Representation |
| --- | --- |
| 0 | Off |
| 1 | On |

Byte 7 of the 21 character PJL Dump preferably describes the output bin function of the DID. An example of a presently preferred list of returns for the output bin byte is shown in Table 8.

TABLE 8

Output Bin Byte

| Byte 7 | Representation |
| --- | --- |
| 0 | Inner |
| 1 | Out 1 |
| 2 | Out 2 |
| 3 | Out 3 |

Byte 8 of the 21 character PJL Dump preferably describes hole punching function of the DID. An example of a presently preferred list of returns for the hole punching byte is shown in Table 9.

TABLE 9

Hole Punching Byte

| Byte 8 | Representation |
| --- | --- |
| 0 | Off |
| 1 | On |

Byte 9 of the 21 character PJL Dump preferably describes whether the alternation function of the DID is active. An example of a presently preferred list of returns for the alternation byte is shown in Table 10.

TABLE 10

Alternation Byte

| Byte 9 | Representation |
| --- | --- |
| 0 | Off |
| 1 | On |

Byte 10 of the 21 character PJL Dump preferably describes whether the cascade function of the DID is active. An example of a presently preferred list of returns for the cascade byte is shown in Table 11.

TABLE 11

Alternation Byte

| Byte 10 | Representation |
| --- | --- |
| 0 | Off |
| 1 | On |

Byte 11 of the 21 character PJL Dump preferably describes whether the duplex change function of the DID is active. The duplex change function suitably represents the type of duplexing to be performed on the output to be generated. An example of a presently preferred list of returns for the duplex change byte is shown in Table 12.

TABLE 12

Alternation Byte

| Byte 11 | Representation |
| --- | --- |
| 0 | Simplex |
| 1 | Duplex |
| 2 | Mixed |

Bytes 12–16 of the 21 character PJL Dump preferably describe the stapling of a document generated by the DID. The 5-byte stapling decimal value preferably represents the stapling direction and position. The definition of stapling direction/position in hexadecimal format are described in Tables 13–16.

TABLE 13

Long Edge Feed Stapling

| Bits 0–2 | Representation |
| --- | --- |
| 000 | No stapling |
| 001 | Front Corner |
| 010 | Center Two Staple |

TABLE 13-continued

Long Edge Feed Stapling

| Bits 0–2 | Representation |
| --- | --- |
| 011 | Rear Corner |
| 100 | Saddle Stitch |

TABLE 14

Long Edge Feed Stapling Rotation

| Bit 7 | Representation |
| --- | --- |
| 0 | No Image Rotation |
| 1 | 180 Degree Image Rotation |

TABLE 15

Short Edge Feed Stapling

| Bits 8–10 | Representation |
| --- | --- |
| 000 | No stapling |
| 001 | Front Corner |
| 010 | Center Two Staple |
| 011 | Rear Corner |
| 100 | Saddle Stitch |

TABLE 16

Long Edge Feed Stapling Rotation

| Bit 15 | Representation |
| --- | --- |
| 0 | No Image Rotation |
| 1 | 180 Degree Image Rotation |

For example, the characters "00131" (0x0083) yield a setting to rotate long edge feed image 180 degrees and staple the rear corner. Similarly, the characters "33280" (0x8200) yield a setting to rotate short edge feed image 180 degrees and perform center two stapling.

Finally, bytes 17–21 of the 21 character PJL Dump are preferably used to describe the department code, user group, or billing code of the DID. Some networks are organized by user groups, some by department code, and some by billing codes. The bytes 17–21 are preferably used to specify the location or ownership of the DID or the location from which the test job originated.

The remainder of the text file from the third line of the text file to the end of file line in the presently preferred embodiment contain information corresponding to a face number, checksum, input bin, and paper size. Preferably, the lines of the text file are of the format:

| Line 3: | <Face No. 1(4C)> <Space(1C)> <Checksum(32C)> <Space(1C)> <InBin(1C)> <Space(1C)> <PaperSize(2C)> |
| --- | --- |
| Line 4: | <Face No. 2(4C)> <Space(1C)> <Checksum(32C)> <Space(1C)> <InBin(1C)> <Space(1C)> <PaperSize(2C)> |
| . . . | |

| Line N+2: | <Face No. N(4C)> <Space(1C)> <Checksum(32C)> <Space(1C)> <InBin(1C)> <Space(1C)> <PaperSize(2C)> <EOF> |
| --- | --- |

When the DID generates the test job information, it suitably generates for each portion of the test job, a file and corresponding computed value uniquely representing the generated file. In the presently preferred embodiment, the portion of the file is a face. The face number specifies the side of a page to which the information on the line corresponds. Because the total number of faces in Line 1 is allocated 4 characters, the face number is also suitably allocated 4 characters so that it represents numbers from 1 through 9,999.

Preferably, for each face, the DID generates a file and a checksum value. Checksum values are suitably 8-bit, 16-bit, 32-bit or some other value. In the presently preferred embodiment, the checksum is 32-bit. As such, the checksum value is represented as a 32-byte string. Furthermore, the checksum is preferably represented as a hexadecimal string. A one character space preferably separates the face number from the checksum. The generation of a checksum is presently preferred because the checksum will change upon any change in a file. Therefore, even visually imperceptible changes are evidenced by a change in the checksum. This permits a tester to more easily discover errors such as image shifts, change in darkness level, change in image size, or change in image content.

Also for each face, the DID suitably generates input bin information as DIDs are capable of changing input bins during the process of generating output. An typical example of such change is a printer printing a first set of pages of a document from one paper tray and a second set of pages of a document from another paper tray. The input bin information is preferably described as a single byte. A one character space preferably separates the checksum bytes from the input bin byte. The input bin byte is preferably DID-specific in that different DIDs have different input bins. An example of a list of returns for the input bin byte for two different DIDs shown in Table 17.

TABLE 17

| | Status Byte | |
| --- | --- | --- |
| Input Bin Byte | DID A | DID B |
| 0: | AUTO_TRAY | AUTO_TRAY |
| 1: | BYPASS | BYPASS |
| 2: | UPPER | UPPER |
| 3: | LOWER | MIDDLE |
| 4: | PFP1 | LOWER |
| 5: | PFP2/LCF | LCF |

In addition, the DID suitably generates paper size information as DIDs are capable of changing paper size during the process of generating output. An typical example of such change is a printer printing a first set of pages of a document on letter paper and a second set of pages of a document on legal paper. The paper size information is preferably described by two bytes. A one character space preferably separates the input bin byte bytes from the paper size bytes. An example of a list of returns for the paper size bytes is shown in Table 18.

TABLE 18

Paper Size Byte

| Paper Size Bytes | Representation |
| --- | --- |
| 00 | LETTER |
| 01 | LEGAL |
| 02 | A4 |
| 03 | EXECUTIVE |
| 04 | STATEMENT |
| 05 | A3 |
| 06 | B4 |
| 07 | B5 |
| 08 | LEDGER |
| 09 | COMPUTER |
| 10 | FOLIO |
| 11 | UNIVERSAL |
| 12 | A5 |
| 13 | A6 |
| 14 | AUTO |
| 15 | LETTER_R |
| 16 | A4_R |
| 17 | A5_R |
| 18 | B5_R |
| 19 | LEGAL13 |
| 20 | 8_5SQ |

Figure 2:
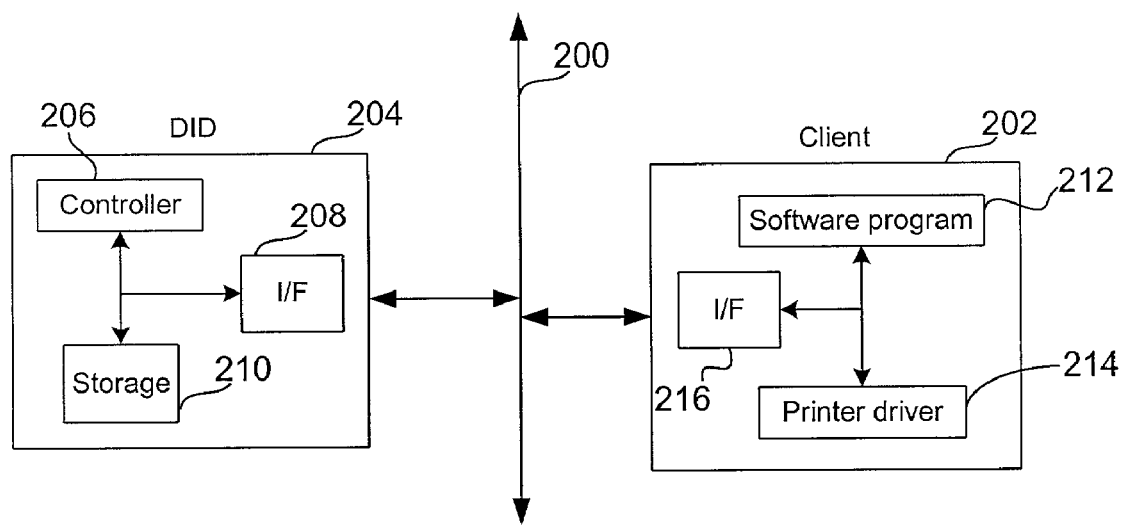
FIG. 2 is a system diagram illustrating a digital imaging system in a network environment in accordance with the present invention.

Turning now to FIG. 2, system diagram illustrating a digital imaging system in a network environment in accordance with the present invention is provided. The network 200 is illustrative of a LAN or WAN environment in which a preferred embodiment is provided. Connected to a network 200 are a Client 202 and a DID 204. The network 200 is suitably any network and is suitably comprised of physical and transport layers such as illustrated by a myriad of conventional data transport mechanisms such as Ethernet, Token-Ring™, 802.11(b), or other wire-based or wireless data communication mechanisms as will be apparent to one of ordinary skill in the art. The Client 202 is suitably any type of computer, but is preferably a PC running as on a Windows, Unix, Macintosh, or Linux based operating system.

The DID 204 is in data communication with a data transport system 200 through a network interface 208. The data transport system 204 is also placed in data communication with at least one Client, such as representative Client 202, through network interface 216. The Client 202 is suitably a Thin Client or a Thick Client. Thus, a data path between one or more DIDs, such as that illustrated by DID 204, is in shared data communication with at least one Client, such as Client 202. The Client 202 is preferably equipped with a software program 212, a DID driver 214, and a network connector 216. The DID 202 and the DID driver 214 suitably comprise a digital imaging system. It should be noted that the printer driver 214 is suitably loaded on the Client 202 or on a network server.

The DID 204 is suitably any networked DID as will be appreciated to one of ordinary skill in the art. However, it should be noted that while the preferred embodiment of the present invention is a network system having a client machine and a DID, the present invention includes systems having a DID and personal computer connected directly to one another through a port such as a parallel port, serial port, USB port, or any other data transport mechanism as will be apparent to one of ordinary skill in the art. The DID 204 suitably comprises internal storage and preferably has an internal device Controller 206 suitably acting as a fully functional server with the necessary hardware and software that ensure proper operation of the DID 204 as will be appreciated by one skilled in the art. In addition, the DID 204 preferably comprises internal storage 210, which is suitably a hard disk or random access memory ("RAM").

In the presently preferred embodiment, a job is sent from Client 202 to DID 204 through network transport 200. Unless instructed otherwise, the DID 204 receives the job, processes the job, and generates output of the type required for fulfillment of the job. For example, if the DID 204 is a MFP or printing device, it suitably generates printed output or prints the job to a file. In order to instruct the DID 204 that it is a test job a user suitably inserts PJL comments in the print test job print data file to enable test information generation. Preferably, the PJL comments comprise an enabling comment, a filename comment, and a job name comment. It should be noted that filename comment suitably includes information about the location of the file as well as a filename. The insertion of the PJL comments is suitably accomplished through the use of automation software. When an enabling comment exists, the Controller 206 preferably generates only test job information and does not generate printed output and does not print the test job to a file. If a user simply enters a name, the location of the file will be the default file directory. The user then sends the test job data file with comments from the Client 202 to the DID 204. In addition, a user suitably sends the test job data file with comments from an administration machine, a server machine, or any machine communicatively coupled to the network 200.

The DID 204 then receives the test job data file and the Controller 206 suitably generates test information comprising a plurality of computed values, each computed value corresponding to a portion of the test job. Preferably, the Controller 206 receives the test job data file, determines whether the test information can be properly generated, and saves status information to a test information output file. In addition, the Controller 206 preferably associates the job name from the PJL comments with the status information, calculates the total number of faces to be generated, and associates the total number of faces with the status information.

Preferably, the job name, total number of faces, and status information are stored in the first line of the text file that the Controller 206 creates and saves in a location specified by filename comment. The file is suitably saved on the DID's internal storage 210, or on any storage drive accessible to the DID throughout a network, which suitably includes storage on the Client 202. The Controller 206 also preferably saves DID settings and mode information on a second line of the text file. In addition, the Controller 206 creates a line in the text file for each face. The lines corresponding to each face preferably comprise information relating to the face number, a checksum for the file generated for the face number, input bin information, and paper size information. When the Controller 206 has created a line for each face of the test job and stored the appropriate information, it suitably generates an end of file command and saves the text file.

The information contained in the text file is then preferably compared to a text file containing information generated by sending the same test job to a control digital imaging system. The control digital imaging system suitably comprises a DID and a DID driver. The comparison is suitably performed by the Controller 206, the Client 202, a separate server or personal computer, or a user. The comparison is preferably performed through the use of automation software as will be appreciated by those skilled in the art. In addition, the two text files are suitably compared manually through a visual analysis by a user or a plurality of users.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A system for paperless testing of image quality comprising:
    means adapted for receiving first electronic document data from a first document source, the first electronic document data including document output data representative of an document and supplemental data corresponding to the first electronic document data, which supplemental document data includes data representative of a desired characteristic of an output document emanating from the first electronic document;
    means adapted for generating image data corresponding to the first electronic document data;
    means adapted for generating first characteristic data associated with the first image data;
    means adapted for receiving second electronic document data from a second document source, the second electronic document data including the document output data;
    means adapted for generating second image data corresponding to received second electronic document data;
    means adapted for generating second characteristic data associated with the second image data; and
    comparison means adapted for generating comparison data relating to a comparison of the first characteristic data and the second characteristic data.

2. The system for paperless testing of image quality of claim 1 wherein the document output data includes data representative of at least one of a monochromatic output and a color output.

3. The system for paperless testing of image quality of claim 1 wherein the document output data includes data representative of at least one of a text output and an image output.

4. The system for paperless testing of image quality of claim 1 wherein the document output data is inserted into the electronic document data.

5. The system for paperless testing of image quality of claim 4 wherein the document output data is inserted into the electronic document data in a page job language comment.

6. The system for paperless testing of image quality of claim 1 wherein the characteristic data includes data representative at least one of total number of faces, resolution, print mode, paper size, paper source, collating operations, duplexing operations, input bin, output bin, stapling operations, and hole punching operations.

7. The system for paperless testing of image quality of claim 1 further comprising storage means adapted for storing the comparison data.

8. The system for paperless testing of image quality of claim 1 further comprising notification means adapted for generating a notification data representative of the status of the comparison means.

9. The system for paperless testing of image quality of claim 1 wherein the comparison data is a checksum.

10. The system for paperless testing of image quality of claim 9 wherein the checksum is a 32-bit checksum.

11. The system for paperless testing of image quality of claim 10 wherein the checksum is a hexadecimal string.

12. A method for paperless testing of image quality comprising the steps of:
    receiving first electronic document data from a first document source, the first electronic document data including document output data representative of an document and supplemental data corresponding to the first electronic document data, which supplemental document data includes data representative of a desired characteristic of an output document emanating from the first electronic document;
    generating image data corresponding to the first electronic document data;
    generating first characteristic data associated with the first image data;
    receiving second electronic document data from a second document source, the second electronic document data including the document output data;
    generating second image data corresponding to received second electronic document data;
    generating second characteristic data associated with the second image data; and
    generating comparison data relating to a comparison of the first characteristic data and the second characteristic data.

13. The method for paperless testing of image quality of claim 12 wherein the document output data includes data representative of at least one of a monochromatic output and a color output.

14. The method for paperless testing of image quality of claim 12 wherein the document output data includes data representative of at least one of a text output and an image output.

15. The method for paperless testing of image quality of claim 12 wherein the document output data is inserted into the electronic document data.

16. The method for paperless testing of image quality of claim 15 wherein the document output data is inserted into the electronic document data in a page job language comment.

17. The method for paperless testing of image quality of claim 12 wherein the characteristic data includes data representative at least one of total number of faces, resolution, print mode, paper size, paper source, collating operations, duplexing operations, input bin, output bin, stapling operations, and hole punching operations.

18. The method for paperless testing of image quality of claim 12 further comprising the step of storing the comparison data.

19. The method for paperless testing of image quality of claim 12 further comprising the step of generating a notification data representative of the status of the comparison means.

20. The method for paperless testing of image quality of claim 12 wherein the comparison data is a checksum.

21. The method for paperless testing of image quality of claim 20 wherein the checksum is a 32-bit checksum.

22. The method for paperless testing of image quality of claim 21 wherein the checksum is a hexadecimal string.

* * * * *